April 12, 1966 L. F. BERHENKE ET AL 3,245,249
MELTING POINT RECORDER
Filed April 6, 1964 4 Sheets-Sheet 1
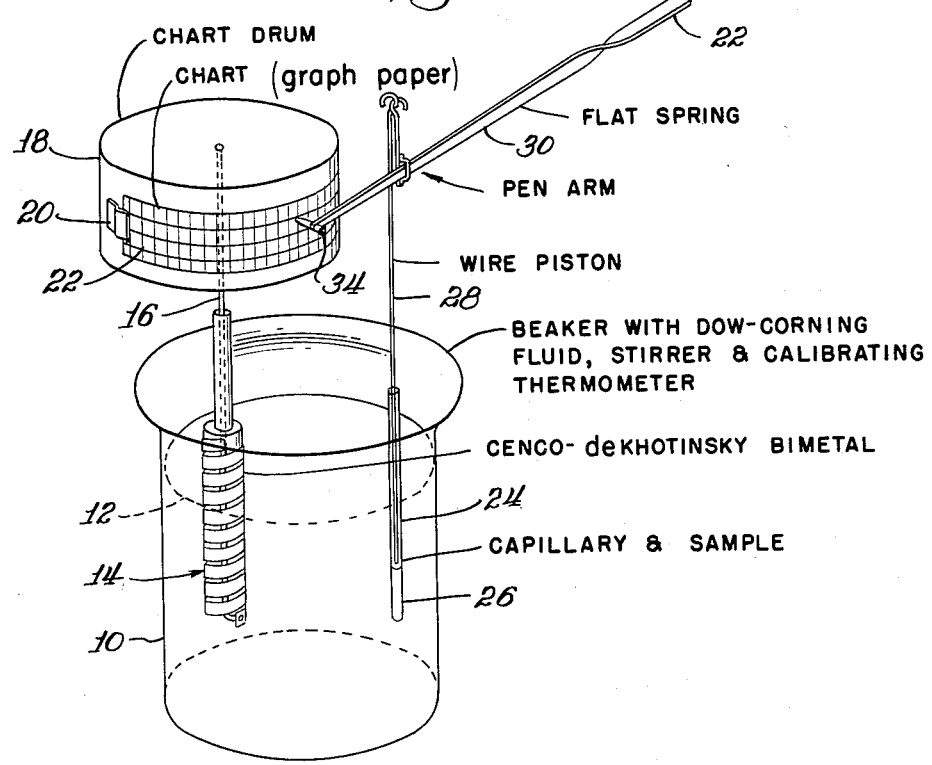
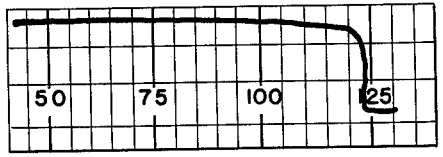
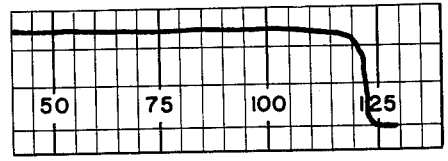
INVENTORS.
LUTHER F. BERHENKE
LEONARD W. HERSCHER
BY
Attys.

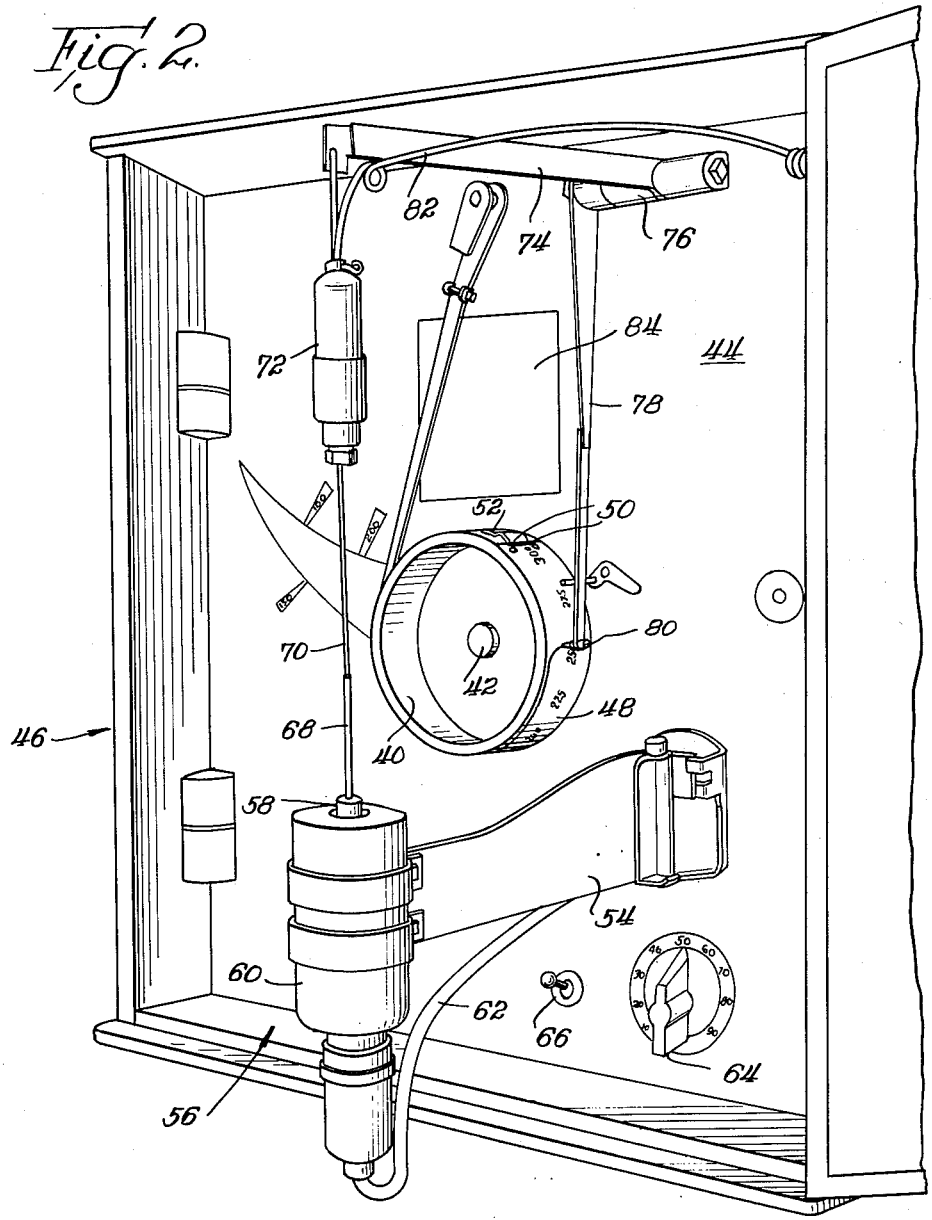

INVENTORS.
LUTHER F. BERHENKE
LEONARD W. HERSCHER

April 12, 1966 L. F. BERHENKE ETAL 3,245,249
MELTING POINT RECORDER
Filed April 6, 1964 4 Sheets-Sheet 4

INVENTORS.
LUTHER F. BERHENKE
LEONARD W. HERSCHER
BY
Dominik & Stein
Jerome Lurdy Attys

United States Patent Office 3,245,249
Patented Apr. 12, 1966

3,245,249
MELTING POINT RECORDER
Luther F. Berhenke and Leonard W. Herscher, Midland, Mich., assignors to The Dow Chemical Company, Midland, Mich., a corporation of Delaware
Filed Apr. 6, 1964, Ser. No. 357,582
7 Claims. (Cl. 73—17)

This application is a continuation-in-part of co-pending application, Serial No. 103,458, filed April 7, 1961, now Patent Number 3,150,514.

This invention relates to a melting point recorder for use in a chemical analysis.

Many compounds, and most pure ones, are characterized by having a sharp melt point, and such criterion is frequently used in chemical analysis, especially in the field of organic chemistry. However, melt point determinations are time consuming since slow heating and constant observation are normally required.

Briefly, in the original application the apparatus disclosed includes a thin walled capillary tube in which a small piston is arranged to seat upon a sample of material whose melt point is to be determined. The piston is connected to an arm means having a stylus for recording piston movement upon a rotatable drum. The latter is driven by recorder apparatus operable in accordance with temperature change of the sample as sensed by the piston. The capillary tube is positioned in a heat pot, which preferably is electrically heated. As the temperature of the sample nears melt point it shrinks, and subsequently melts, resulting in movement of the piston, which movement is recorded on the drum. The apparatus produces results which are relatively independent of sample heating rate, and which have an accuracy limited only by the accuracy of the recorder apparatus.

In this original application, the recording apparatus comprises an integral part of the melt point recorder. That is, the apparatus for detecting the change in sample temperature and for indicating the point at which the sample melts and the recording means are constructed as one unit. Inasmuch as recorders are relatively expensive, it would be particularly desirable to have melt point indicator apparatus which could be used with existing recorders so that there would not be any necessity to purchase the recorder as an integral part of the unit. A considerable savings would result from this expedient.

One object of this invention therefore is to provide such an apparatus, that is, melt point indicator apparatus which may be used in conjunction with existing standard recorders to automatically record melt point information of a given material.

Still another object is to provide apparatus of the above-described type which is fast, simple to operate, and utilizes only milligrams of sample.

Another object is to provide apparatus of the above-described type which requires little attention during operation, and which produces a permanent record.

A further object is to provide apparatus of the above-described type which produces results relatively independent of sample heating rate.

These and further objects and features of the invention will become more apparent from the following description and accompanying drawings wherein:

FIG. 1 is a perspective view of a simplified model embodying the principles of the invention;

FIG. 2 is a perspective-like view of a more advanced model embodying the principles of the invention;

FIGS. 3 and 4 illustrate typical melt curves obtained with use of the apparatus of FIG. 2;

Figure 5:
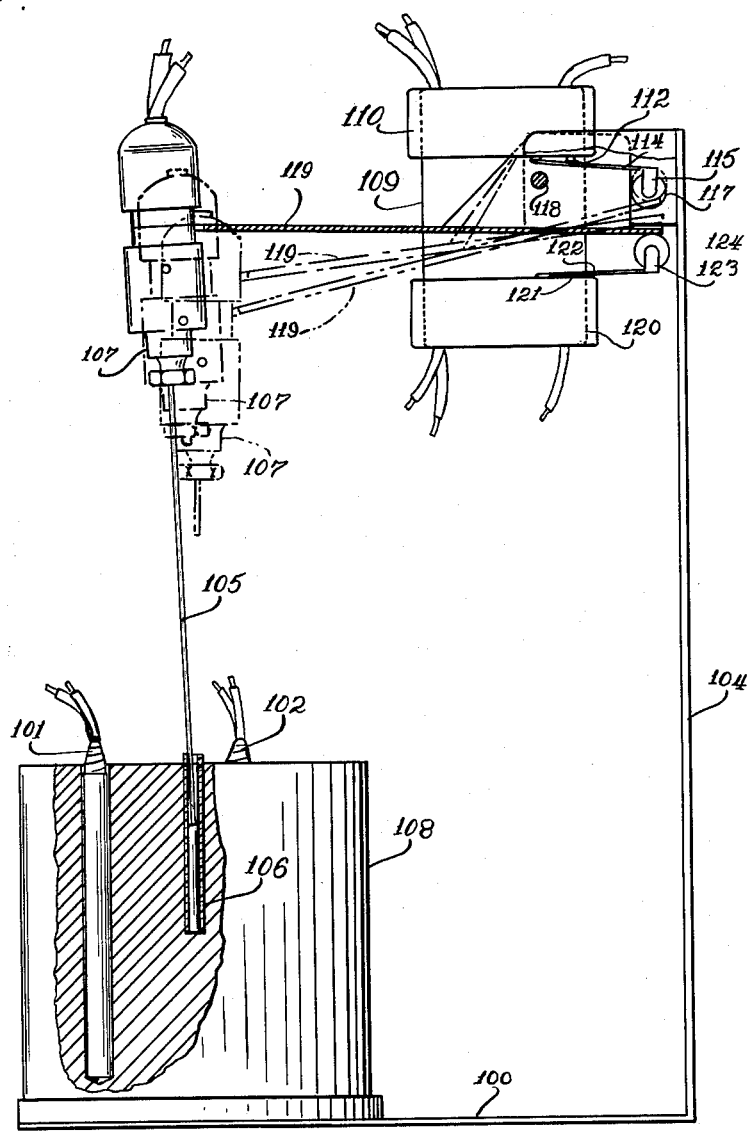
FIG. 5 is a side view of a melt point indicator apparatus embodying the principles of the invention which may be connected to presently existing recorders to automatically record the melt point of a given sample.

Referring now to the drawings, and more particularly to FIG. 1, numeral 10 identifies a beaker, or container, for a given quantity of fluid 12, such as oil, in which is immersed a stirrer and a calibrating thermometer (neither shown). Means are provided for heating the fluid 12 to a temperature as required for melting the sample of material being analyzed. A bimetal helix assemblage 14, such as used in a Cenco-de Khotinsky thermo-regulator, is arranged for submersion in the fluid 12. A rotatable shaft 16 projecting vertically from the upper end of the assemblage 14, is arranged to support a cylindrical chart drum 18. Heating of the helix assemblage 14, will cause rotation of the shaft 16, in the well known manner. Clip means 20 are affixed to the drum for use in removably securing a strip of chart paper 22 about the periphery of the drum an angular distance of approximately 330°.

A capillary tube 24 is arranged for submersion in the fluid 12, the lower end of the tube being closed whereby a small sample of material 26 may be contained therein. A piston, preferably in the form of a metal wire 28, is slidably arranged in the tube 24, the lower end of the piston resting upon the sample 26, the upper end being secured to a pen arm 30 which is supported in a generally horizontal position. The pen arm 30, is formed of a flat spring, one end 32 being bent at a right angle to the body of the pen arm so that the arm may be affixed to a support (not shown) in a manner providing for vertical movement of the arm about the fixed end. At the free end of the arm a marking means, such as a stylus 34, is affixed for marking an ink line upon the chart paper 22 as the drum 18 revolves. For the sake of simplicity, means for mounting the various elements have not been illustrated, however, such details would pose no problem for those skilled in the art.

The operation of the above-identified device is very simple. A strip of chart paper 22 having a calibrated scale of sufficient range for the temperature spread expected to be encountered, is affixed in position upon the drum 18. A sample of material being analyzed for melt point is put in the capillary to a depth of 1.5 to 2.0 cm., and the piston 28 is inserted in the capillary to rest upon the sample. The loaded capillary, with the piston extending therefrom, is placed in the fluid 12, and the piston is affixed to the pen arm 30. Next the stylus 34 is adjusted upon the chart paper so that the marking point of the stylus contacts the paper at a temperature indication corresponding to the temperature of the fluid 12. The fluid is then heated to whatever temperature is necessary to cause melting of the sample 26. As the fluid temperature increases, the bimetal assemblage 14, will cause rotational movement of the drum 18, and a line will be marked by the stylus upon the chart. The line will be substantially horizontal until the melt temperature of the sample is reached, at which point the line will drop abruptly, in the manner illustrated in either of the examples of FIGS. 3 and 4, or in some other pattern peculiar to the type and purity of the material being analyzed.

While the simplified model could be expected to provide results within 2° C. of established melt point temperatures for given samples, which results may not be sufficiently accurate in many cases, it does clearly illustrate the operating principles of the inventive concept, and exhibits other desirable features associated with the invention, such as, providing fast results, simplicity of operation, use of small samples, requires little attention during operation, and provides a permanent record.

A more refined model embodying the principles of the invention, and capable of melt point determinations within ±0.5° C. accuracy, is illustrated in FIG. 2. The basic unit included in the refined model may be similar to a (0–300° C.) Minneapolis-Honeywell Brown "Electronik" recorder and thermo-couple, modified as described below.

A cylindrical chart drum 40 is axially mounted upon a shaft 42 which projects horizontally through a wall 44 forming part of a recorder 46. A drive means (not shown) is arranged in the recorder, which drive means is adapted to rotate the drum in accordance with changes in sample temperature. The drum 40 has means for holding a paper strip chart 48 upon the periphery thereof, which holding means may comprise two index pins 50 for anchoring one end of the paper chart, while a spring slip 52 is arranged fo rholding the other end of the strip chart.

A swing-out arm 54 is mounted upon the wall 44, which arm is similar to that used on a wall type can opener, and which may be selectively locked in a vertical plane normal to the plane of the wall 44. Affixed to the end of the arm 54 is a sample heating assemblage 56, including a tubular melting block 58, surrounded by a heater element 60 enclosed in appropriate thermal insulation. The heater element is preferably of the electrical type, such as used on a soldering iron (American Beauty No. 9273). Current is supplied to the heater element via an insulated wire 62, leading from a small variable transformer (not shown) regulated by a control knob 64. Heater current is controlled by a switch 66 mounted upon the wall 44 of the recorder.

A capillary tube 68 is positionable within the melting block 58, which tube has a closed lower end so that a small sample of the material under analysis may be held. Slidably arranged in the tube in substantially friction-free engagement, is a thermo-couple 70 which serves as a piston and which rests upon the sample. The couple itself is at the lower extremity of the piston so that the temperature measured is that of the sample being heated. The thermo-couple is affixed to a connector block 72 which is suspended from one end of a piston arm 74, the other end of the arm being secured to a sleeve, or shaft 76, rotatably mounted in conical pivot bearings supported upon the wall 44. In the embodiment being described, the thermo-couple and connector block weighed about 30 grams which subjected the sample to a pressure of approximately 50 p.s.i. However, the effect of such weight upon the melting point of a sample was estimated to be less than 0.2° C.

A pen arm 78, affixed to the shaft 76, has a marking means, such as an inking stylus 80, arranged at the lower end. The latter is adapted for contacting the drum chart 48, so that as the drum rotates a line will be drawn upon the chart. A spring loaded friction clutch is preferably arranged between one of the arms 74 or 78 and the shaft 76, so that the relative angular position of the two arms can be adjusted. It will be seen that rotary movement of the piston arm 74, will cause rotary movement of the pen arm 78. A wire 82 extends between the connector block 72 and the apparatus which drives the drum 40, whereby the latter is rotated in accordance with the temperature sensed by the thermo-couple, in a well known manner.

It will be noted that the arms 54 and 74 may be swung back toward the wall 44, so that a cover (not shown) may be used to close the recorder.

In working with samples of material which would be corrosive to metal, a glass piston rod may be used, and the thermo-couple inserted in the melting block in close proximity to the sample being analyzed.

Operation of the above described apparatus is quite simple. A strip chart 48 is affixed to the drum 40, and a sample of material is placed in the capillary to a depth of 1.5 to 2 cm., which is then placed in the melting block 58. The thermo-couple piston 70 is then inserted in the capillary so that the lower end rests upon the sample. The stylus 80 is then adjusted upon the chart 48, at a temperature marking which corresponds to the initial temperature of the sample. Next, the melting block 58 is heated by turning on the current, the heating rate being adjusted to desired value. In this connection, it will be found useful to devise a heating rate chart 84, which indicates heating curves for various settings of the variable transformer, which chart may be affixed to the wall 44 of the recorder. However, it will be found that the heating rate will not usually be critical. As the melt point of the sample is reached, the piston 70 will move downwardly, and such movement will be recorded on the chart 48.

The accuracy of melt point temperature, is essentially that of the recorder, as has been mentioned before. The shape of the curve made upon the chart is influenced to some extent by the packing of the sample, however, results obtained by various operators will be found to be in good agreement. Principal variations will be in the interpolated wetting and meniscus points, more with impure than with pure samples. The melting point is not so influenced. Because the apparatus measures only volume changes, subtle changes such as polymorphic transformations, desolvations, etc., without appreciable volume changes will not be recorded. However, shrinkages often unnoticed in a capillary, are vividly indicated in operation of the apparatus.

The relative unimportance of heat rate is illustrated in FIGS. 3 and 4, which indicate results obtained in melt point determinations of equivalent samples of benzoic acid with use of apparatus of the invention. The curve shown in FIG. 3 was obtained at a 2°/min. heat rate while the curve shown in FIG. 4 was obtained with an 8°/min. heat rate.

Generally, the final temperature on the recorder corresponds more closely to the initial melting point (meniscus) in a capillary or to the freezing point of a larger sample. The purer the sample, the closer the agreement.

Measurement of piston travel at several points indicates that, roughly, 10% travel corresponds to the "wetting" point and 25% travel to the meniscus point. This may not be true for irregular shaped curves, such as more often produced by impure samples, or where the several components of a given sample form eutectics.

Referring now to FIGS. 5–8, a melt point indicator which is adapted to be connected to a recorder and which embodies the principles set forth in the above-mentioned copending application is illustrated. It may be noted that the melt point indicator is a self-contained unit which is separately energized and which has its own supporting structure which includes the base 100 and the upright support 104.

Figure 8:
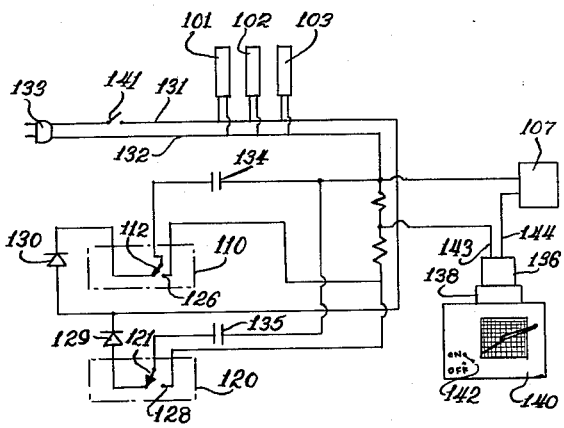
FIG. 8 is a schematic diagram of the electrical portion of the apparatus shown in FIG. 5.

Connected to the base 100 is the sample heating assemblage, including a melting block 108 and the heater elements 101–103 enclosed in appropriate thermal insulation. As in the case of the heater element used with the refined model illustrated in FIG. 2, these heater elements are preferably of the electrical type, such as used on a soldering iron (American Beauty No. 9273). Current is supplied to the heater elements 101–103 by means of the insulated wires which are connected as shown in FIG. 8. The electrical circuitry of the melt point indicator will be described more fully hereinafter.

A capillary tube 106 is positionable within the melting block 108, which tube has a closed lower end so that a small sample of the material under analysis may be contained therein. Slideably arranged in the tube 106 in substantially friction-free engagement, is a thermo-couple 105 which serves as a piston and which rests upon the sample. The couple itself is at the lower extremity of the piston so that the temperature measured is that of the sample being heated. The thermo-couple is affixed to a connector block 107 which is suspended from one end of a piston arm 119, the other end of the arm being secured to a sleeve, or shaft 118, rotatably mounted in the bracket assembly supported upon the upright support 104. In the embodiment being described, the thermo-couple and the connector block, as in the previously described embodiment, weighs about 30 grams which subjects the sample to a pressure of approximately 50 p.s.i., and the effect of such weight upon the melting point is estimated to be less than 0.2° C.

A pair of microswitches 110 and 120 are mounted vertically upon the mounting plate 109 adjustably secured to the upright support 104, with the piston arm 119 extending between them. A pair of rollers 117 and 124 rotatably secured in the flanges 115 and 123 formed in the ends of the flexible members 114 and 122 connected to the microswitches are engaged by the piston arm 119 to operate the contacts 112 and 121, in the manner described below.

In the illustrated embodiment, the microswitches 110 and 120 are positioned with respect to one another and to the piston arm 119 so that when the piston 105 is resting upon the sample of material placed in the capillary tube 106, the piston arm 119 engages the roller 124, forcing the flexible member 122 against the contact 121 to hold it in a first operative position. As the sample of material begins to melt, the piston, and hence the piston arm 119, drops downwardly, and the piston arm 119 is disengaged from the roller 124. The flexible member 122 is no longer forced against the contact 121, and the contact switches to a second operative position. When the sample is completely melted and the piston is at the end of its travel, against the bottom of the capillary tube 106, the roller 117 is engaged by the piston arm 119, to force the flexible member 114 against the contact 112 to switch it from a first operative position to a second operative position.

The above-described mechanical movements are translated by the electrical circuitry shown in FIG. 8 to electrical signals, which may be conveyed to a standard recorder to operate the same to provide a permanent, visual record of the points at which melting of the sample starts and is completed. This apparatus, therefore, has the advantage that it may be readily attached to existing standard recorder so that it is not necessary to purchase a recorder as an integral part of the melt point recording apparatus.

Referring now to FIG. 8, the rectangular boxes indicated by the reference numerals 110 and 120 represent the microswitches 110 and 120, respectively. Also, the contacts 112 and 121 of the microswitches are represented by the arrows 112 and 121, and are shown in their first operative position.

In operation, the plug 136 is connected to the input circuit 138 of a standard recorder, such as the recorder 140, having a writing surface which is responsive to time and a pen which is responsive to temperature. The melt point indicator apparatus is energized by connecting the plug 133 to any 60 cycle, 110 volt outlet. Means may be provided for similarly energizing the recorder. The melt point indicator apparatus and the recorder are then simultaneously energized by closing the switches 141 and 142.

Upon closing the switch 141, current flows through the heating elements 101–103 connected in parallel across the conductors 131 and 132, to energize the same to heat the sample material in the capillary tube 106. Current also flows through conductor 131, contacts 112 and 121, and unidirectionally through diodes 130 and 129, to charge the capacitors 134 and 135 connected in series with the conductor 132. The thermo-couple detects the change in sample temperature, and this information is coupled to the recorder 140 by conductors 143 and 144 to cause its pen to chart this change on the writing surface, which is responsive to time.

As the sample of material begins to melt, the piston arm 119 drops downwardly and is disengaged from the roller 124, in the manner described above, and contact 121 is switched to its second operative position, indicated by the reference numeral 128. As soon as this occurs, the capacitor 135 is discharged through the thermo-couple 107 and detected by the recorder 140, causing a pip to appear on the chart. When the melting is complete, the piston arm 119 engages the roller 117, in the manner described above, and the contact 112 is switched to its second operative position, indicated by the reference numeral 126, to cause the capacitor 134 to be discharged through the thermo-couple 107 to the recorder 140, causing a second pip to appear on the chart. It may be desirable to have the pips extend in opposite directions in which case the pair of diodes 129 and 130 may be connected in opposite conductive directions in series with the capacitors 135 and 134, as shown in FIG. 8, to cause them to be charged in opposite senses. Upon being discharged, these capacitors will then cause pips which extend in opposite directions on the chart to appear.

Figure 9:
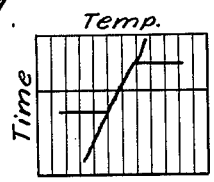
FIGS. 9 and 10 illustrate typical melt curves obtained with use of the apparatus of FIG. 5.
Figure 7:
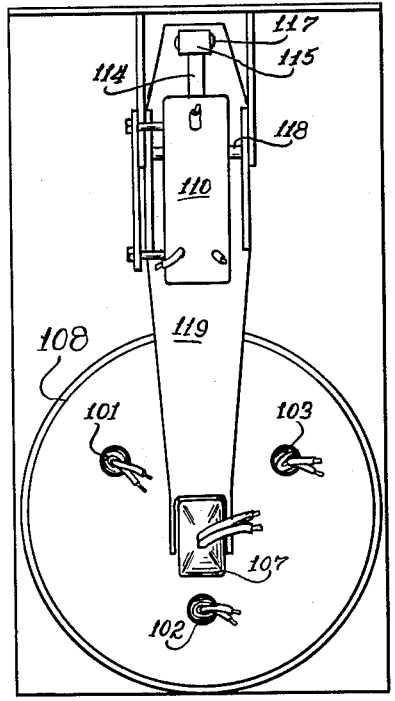
FIG. 7 is a top view of the melt point indicator apparatus shown in FIG. 6, taken along the lines 7—7.
Figure 6:
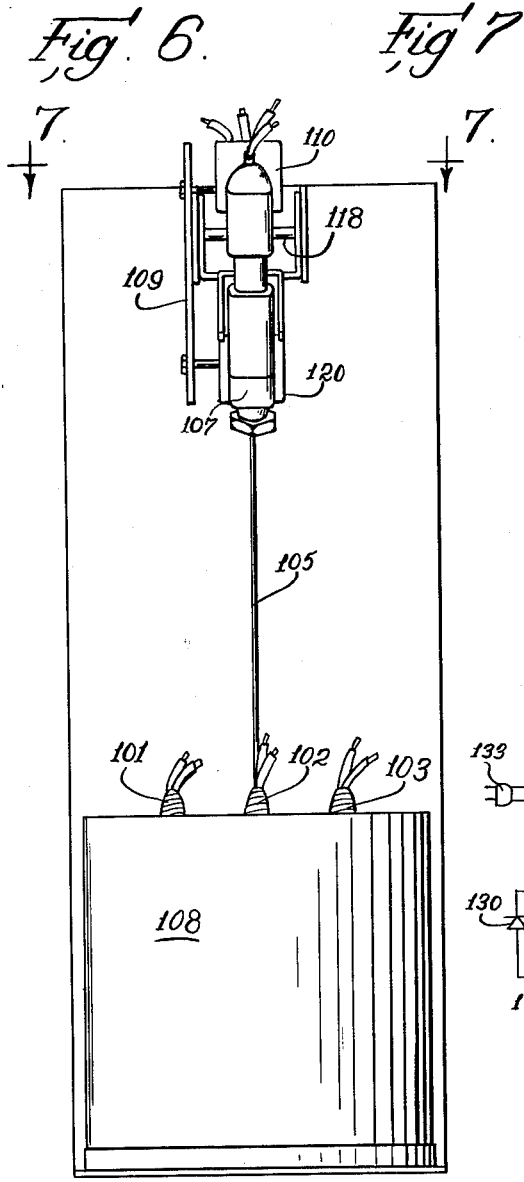
FIG. 6 is a front view of the melt point indicator apparatus shown in FIG. 5.
Figure 10:
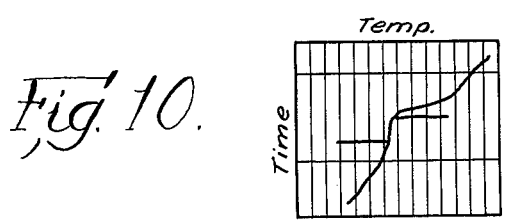

Two curves which are exemplary of the results obtained in melt point determinations using the apparatus of FIG. 5 are illustrated in FIGS. 9 and 10. The point at which the sample of material begins to melt and the point at which melting is completed is clearly indicated by the pips on each of the curves. It may be noted that, in both FIGS. 9 and 10, the diodes 129 and 130 were connected in opposite conductive directions in series with the capacitors 135 and 134, so that the pips extend in opposite directions.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

We claim:

1. Apparatus connectable to a standard recorder having a writing surface responsive to time and a pen responsive to temperature for indicating the points at which melting of a sample of material starts and is completed comprising, container means for holding a sample of material for which determination of melt point information is desired, contact means positionable in said container means so that it can engage a sample in said container means, follower means responsive to movement of said contact means as the volume of the sample changes under the influence of heat, switching means operated by said follower means, and means connected to said switching means for providing electrical output signals to said recorder to operate the same in accordance with the condition of said switching means.

2. Apparatus connectable to a standard recorder having a writing surface responsive to time and a pen responsive to temperature for indicating the points at which melting of a sample of material starts and is completed comprising, container means for holding a sample of material from which determination of melt point information is desired, contact means positionable in said container means so that it can engage a sample in said container means, follower means responsive to movement of said contact means as the volume of the sample changes under the influence of heat, switching means having first and second operative positions and operated by said follower means to switch said switching means from said first to said second operative positions, means connected to said switch means for storing an electrical signal when said switching means are in said first operative positions, and means transferring said stored electrical signals to said recorder when said switching means are switched to said second operative positions.

3. Apparatus connectable to a standard recorder having a writing surface responsive to time and a pen responsive to temperature for indicating the points at which melting of a sample of material starts and is completed comprising, container means for holding a sample of material for which determination of melt point information is desired, contact means positionable in said container means so that it can engage a sample in said container means, follower means responsive to movement of said contact means as the volume of the sample changes under the influence of heat, switch means having a first and second operative position operated by said follower means, said switch means normally in a first operative position, capacitor means connected to said switch means and charged when said switch means is in said first operative position and discharged through said recorder when said switch means is switched to said second operative position by said follower means.

4. Apparatus connectable to a standard recorder having a writing surface responsive to time and a pen responsive to temperature for indicating the points at which melting of a sample of material starts and is completed comprising, container means for holding a sample of material for which determination of melt point information is desired, contact means positionable in said container means so that it can engage a sample in said container means, follower means responsive to movement of said contact means as the volume of the sample changes under the influence of heat, first and second switch means each having a first and a second operative position operated by said follower means, first capacitor means connected to said first switch means and charged when said first switch means is in said first operative position and discharged through said recorder means when said first switch means is switched to said second operative position to indicate when melting of said sample starts, second capacitor means connected to said second switch means and charged when said second switch means is in said first operative position and discharged through said recorder when said second switch means is in said first operative position and discharged through said recorder when said second switch means is switched to said second operative position to indicate when melting of said sample is completed.

5. Apparatus as claimed in claim 4, including a pair of unilateral conducting devices connected in series in opposite conductive directions with said capacitors to charge said capacitors in opposite senses.

6. Apparatus connectable to a standard recorder having a writing surface responsive to time and a pen responsive to temperature for indicating the points at which melting of a sample of material starts and is completed comprising, a thin walled capillary tube closed at one end for holding a sample of material for which determination of melt point temperature is desired, piston means positionable in said tube so that it can engage a sample in said tube, follower means responsive to movement of said piston means as the volume of the sample changes under the influence of heat, switching means operated by said follower means, and means connected to said switching means for providing electrical output signals to said recorder to operate the same in accordance with the condition of said switching means.

7. Apparatus connectable to a standard recorder having a writing surface responsive to time and a pen responsive to temperature for indicating the points at which melting of a sample of material starts and is completed comprising, a thin walled capillary tube closed at one end for holding a sample of material for which determination of melt point information is desired, piston means positionable in said tube so that it can engage a sample in said tube, follower means responsive to movement of said piston means as the volume of the sample changes under the influence of heat, switch means operated by said follower means when melting of said material starts and when melting of said sample of material is completed, and means connected to said switch means transferring a first signal to said recorder when said switch means is first operated and transferring a second signal to said recorder when said switch means is second operated.

No references cited.

RICHARD C. QUEISSER, *Primary Examiner.*